(12) United States Patent
Juslen et al.

(10) Patent No.: US 12,389,514 B2
(45) Date of Patent: Aug. 12, 2025

(54) TECHNIQUE FOR CONTROLLING OPERATIONAL DEPENDENCIES AMONG LUMINAIRES OF A LIGHTING SYSTEM

(71) Applicant: Helvar Oy AB, Espoo (FI)

(72) Inventors: Henri Juslen, Espoo (FI); Matti Vesterinen, Espoo (FI)

(73) Assignee: Helvar Oy Ab, Espoo (FI)

( * ) Notice: Subject to any disclaimer, the term of this patent is extended or adjusted under 35 U.S.C. 154(b) by 172 days.

(21) Appl. No.: 18/113,684

(22) Filed: Feb. 24, 2023

(65) Prior Publication Data
US 2023/0276558 A1 Aug. 31, 2023

(30) Foreign Application Priority Data
Feb. 25, 2022 (EP) .................................... 22158833

(51) Int. Cl.
| | |
|---|---|
| *H05B 47/19* | (2020.01) |
| *H05B 47/115* | (2020.01) |
| *H05B 47/155* | (2020.01) |
| *H05B 47/165* | (2020.01) |

(52) U.S. Cl.
CPC .......... *H05B 47/19* (2020.01); *H05B 47/115* (2020.01); *H05B 47/155* (2020.01); *H05B 47/165* (2020.01)

(58) Field of Classification Search
CPC .... H05B 47/19; H05B 47/115; H05B 47/155; H05B 47/165; Y02B 20/40
See application file for complete search history.

(56) References Cited

U.S. PATENT DOCUMENTS

| | | | | |
|---|---|---|---|---|
| 6,748,299 | B1* | 6/2004 | Motoyama | H05B 47/10 700/286 |
| 2012/0091895 | A1* | 4/2012 | De Groot | H05B 47/175 315/130 |
| 2013/0293115 | A1* | 11/2013 | De Groot | H05B 47/196 315/152 |
| 2023/0284359 | A1* | 9/2023 | Ajmeer | H05B 47/175 315/131 |

* cited by examiner

*Primary Examiner* — Raymond R Chai
(74) *Attorney, Agent, or Firm* — McCarter & English, LLP

(57) ABSTRACT

A method in a lighting system includes a lighting system control entity and a plurality of luminaires wirelessly coupled to the lighting system control entity. The method includes controlling light output of a respective luminaire in accordance with a preprogrammed lighting control logic that defines switching on the light output in response to detecting occupancy at the respective luminaire, transmitting status indications to and receiving status indications from other luminaires, deriving relationship data including relationship strength values, each pertaining to a particular luminaire and being descriptive of an extent of regularity at which reception of a status indication that indicates an occurrence of a given event pertaining to the particular luminaire is followed by detecting occupancy at the respective luminaire, and transmitting the relationship data to the lighting system control entity. The method includes controlling an aspect of operational dependencies among the luminaires in accordance with the relationship data.

20 Claims, 3 Drawing Sheets

200

---

Control, in a luminaire of a plurality of luminaires, light output of the respective luminaire in accordance with a preprogrammed lighting control logic that defines switching on the light output in response to detecting occupancy at the luminaire
202

---

Transmit, from the luminaire to other luminaires, status indications, where each status indicaiton is descriptive of a respective occurrence of an event pertaining to the luminaire
204a Receive, at the luminaire from other luminaires, respective status indications, where each status indicaiton is descriptive of a respective occurrence of an event pertaining to respective other luminaire
204b

---

Derive relationship data including one or more relationship strength values, wherein each relationship strength value pertains to a particular other luminaire and is descriptive of an extent of regularity at which reception of a status indication that indicates an occurrence of a given event pertaining the particular other luminaire is followed by detecting occupancy at the luminaire
206

---

Transmit the relationship data from the luminaire to a lighting system server
208

---

Control, in the light system server, at least one aspect of operational dependencies among the plurailty of luminaires in accordance with the relationship data received from the plurality of luminaires
210

Figure 5

TECHNIQUE FOR CONTROLLING OPERATIONAL DEPENDENCIES AMONG LUMINAIRES OF A LIGHTING SYSTEM

TECHNICAL FIELD

The present invention relates to control of light output of luminaires operating as part of a lighting system based on sensor data captured at the luminaires.

BACKGROUND

Many lighting systems applied for illuminating an indoor space and/or an outdoor space involve usage of luminaires that are able to autonomously control at least some aspects of their operation based on environmental characteristics determined via usage of one or more sensors provided in the space. Typical, but non-limiting, examples of sensors applicable for at least partially controlling the light output from luminaires of a lighting system include an occupancy sensor and a light sensor: while occupancy sensors may be applied to switch lights on in response to detecting occupancy in the illuminated space and to switch lights off in response to detecting non-occupancy in the illuminated space, light sensors may be applied to control the light output in view of the ambient light in the space such that a desired level of illumination is provided. Hence, occupancy sensors and light sensors enable at least partially autonomous lighting control that ensures user comfort while minimizing energy consumption.

Sensors applied for controlling light output of a luminaire may be arranged in a sensor unit or a sensor portion provided in the luminaire, whereas respective sensor signals obtained from sensors of such an integrated sensor unit may be applied for controlling respective light output of the luminaire. Moreover, two or more such luminaires provided with integrated sensor units may be arranged into a luminaire group, where a certain luminaire of the group may control some aspects of its light output based on sensor data captured at other luminaires of the same luminaire group and/or based on operational statuses of the other luminaires of the luminaire group. An example of such group-based lighting control includes switching on or keeping on the light output of the certain luminaire in case of sensor data captured at another luminaire in the same luminaire group indicating occupancy and/or switching on or keeping on its light output even if the sensor data acquired at the certain luminaire does not indicate occupancy, whereas in another example the group-based lighting control may involve the certain luminaire switching off its light output (e.g. via application of a shortened dimming curve) in case of respective sensor data captured at all luminaires of the luminaire group indicates non-occupancy.

To enable such group-based lighting control at a certain luminaire, the certain luminaire needs to have knowledge of the other luminaires assigned to the same luminaire group with the certain luminaire and information of lighting control actions (e.g. switching or keeping the light output on or off) taken at other luminaires of the luminaire group. Such information may be acquired via the luminaires of the lighting system transmitting (e.g. broadcasting) messages that include information of sensor data captured therein and/or information on lighting control actions taken thereat to other luminaires of the lighting system via a lighting control network that connects the luminaires of the lighting system to each other.

Luminaire grouping may be useful, for example, to ensure sufficient lighting at and close to locations where occupancy is detected and/or to ensure substantially uniform lighting from multiple luminaires that are relatively close to each other in the same space (e.g. in the same room). In a traditional lighting system design the information that defines any luminaire groups applied therein is manually preconfigured into the luminaires upon installing, configuring or reconfiguring the lighting system to enable the group-based lighting control. However, especially in large lighting systems manual configuration of the luminaires to enable the group-based lighting control constitutes a significant effort while the manual configuration procedure is also prone to errors and hence advanced approaches in this regard are highly desirable.

SUMMARY

It is an object of the present invention to provide an approach for automated or semi-automated determination of luminaire groups for a lighting system.

According to an example embodiment, a lighting system comprising a lighting system control entity and a plurality of luminaires that are wirelessly coupled to the lighting system control entity is provided, wherein a luminaire of the plurality of luminaires comprises: a luminaire control portion arranged to control light output of the respective luminaire in accordance with a preprogrammed lighting control logic that defines switching on the light output in response to detecting occupancy at the respective luminaire, and transmit status indications to and receive status indications from other ones of the plurality of luminaires, wherein each status indication is descriptive of an occurrence of an event pertaining to a luminaire transmitting the respective status indication; and an adaptation portion arranged to derive relationship data including one or more relationship strength values, wherein each relationship strength value pertains to a particular other luminaire of said plurality of luminaires and is descriptive of an extent of regularity at which reception of a status indication that indicates an occurrence of a given event pertaining to the particular other luminaire is followed by detecting occupancy at the respective luminaire, and transmit the relationship data to the lighting system control entity; and wherein the lighting system control entity comprises a control portion arranged to control at least one aspect of operational dependencies among the plurality of luminaires in accordance with the relationship data received from the plurality of luminaires.

According to another example embodiment, a method in a lighting system comprising a lighting system control entity and a plurality of luminaires that are wirelessly coupled to the lighting system control entity is provided, wherein the method comprises, in a luminaire of the plurality of luminaires, controlling light output of the respective luminaire in accordance with a preprogrammed lighting control logic that defines switching on the light output in response to detecting occupancy at the respective luminaire, transmitting status indications to and receiving status indications from other ones of the plurality of luminaires, wherein each status indication is descriptive of an occurrence of an event pertaining to a luminaire transmitting the respective status indication, deriving relationship data including one or more relationship strength values, wherein each relationship strength value pertains to a particular other luminaire of said plurality of luminaires and is descriptive of an extent of regularity at which reception of a status indication that indicates an occurrence of a given event pertaining to the particular other luminaire is followed by detecting occupancy at the respective luminaire, and transmitting the relationship data to the lighting system control entity; and wherein the method comprises, in the lighting system control entity, controlling at least one aspect of operational dependencies among the plurality of luminaires in accordance with the relationship data received from the plurality of luminaires.

According to another example embodiment, a computer program is provided, the computer program comprising computer readable program code configured to cause performing at least a method according to an example embodiment described in the foregoing when said program code is executed on one or more computing apparatuses.

The computer program according to the above-described example embodiment may be embodied on a volatile or a non-volatile computer-readable record medium, for example as a computer program product comprising at least one computer readable non-transitory medium having the program code stored thereon, which, when executed by one or more computing apparatuses, causes the computing apparatuses at least to perform the method according to the example embodiment described in the foregoing.

The exemplifying embodiments of the invention presented in this patent application are not to be interpreted to pose limitations to the applicability of the appended claims. The verb "to comprise" and its derivatives are used in this patent application as an open limitation that does not exclude the existence of also unrecited features. The features described in the following examples may be used in combinations other than those explicitly described, unless explicitly stated otherwise.

Some features of the invention are set forth in the appended claims. Aspects of the invention, however, both as to its construction and its method of operation, together with additional objects and advantages thereof, will be best understood from the following description of some example embodiments when read in connection with the accompanying drawings.

BRIEF DESCRIPTION OF FIGURES

The embodiments of the invention are illustrated by way of example, and not by way of limitation, in the figures of the accompanying drawings, where

FIG. 5 illustrates a method according to an example; and

DESCRIPTION OF SOME EMBODIMENTS

Figure 1:
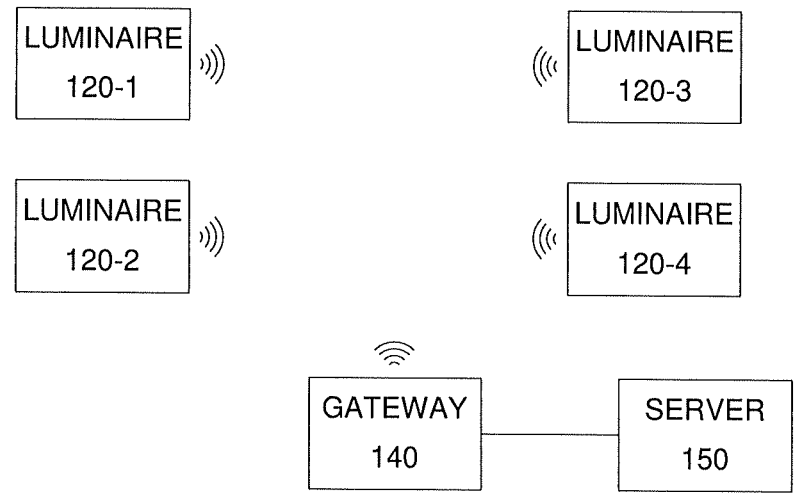
FIG. 1 illustrates a block diagram of some logical components of a lighting system according to an example.

FIG. 1 illustrates a block diagram of some components of a lighting system 100 according to an example. The lighting system 100 may be arranged for illuminating a space or area, which may comprise e.g. one or more indoor spaces or areas and/or one or more outdoor spaces or areas. In the following, for brevity of description, the space or area that the lighting system 100 serves to illuminate is referred to as an illuminated space.

In the example of FIG. 1 the lighting system 100 is shown with luminaires 120-1, 120-2, 120-3 and 120-4, a lighting system gateway 140 and a lighting system server 150. The luminaires 120-1 to 120-4 represent a plurality of luminaires 120, whereas any individual luminaire may be referred to via a reference number 120-$k$. The plurality of luminaires 120 are arranged for illuminating respective locations of the illuminated space. In this regard, it is worth noting that the example of FIG. 1 serves to illustrate the plurality of luminaires 120, the lighting system gateway 140 and the lighting system server 150 as respective elements of the lighting system 100, while on the other hand the illustration of FIG. 1 does not serve to illustrate any physical characteristics of these elements of the lighting system 100 and/or spatial relationship between these elements of the lighting system 100.

The plurality of luminaires 120 and the lighting system gateway 140 may be communicatively coupled to each other via respective wireless communication links or via a wireless communication network provided using a suitable wireless communication technique known in the art, each of the plurality of luminaires 120 and the lighting system gateway 140 hence serving as a respective node of a lighting control network. The lighting system gateway 140 may be communicatively coupled to the lighting system server 150 via a wireless or wired communication link or communication network to enable transfer of information between the lighting system gateway 140 and the lighting system server 150.

Figure 2:
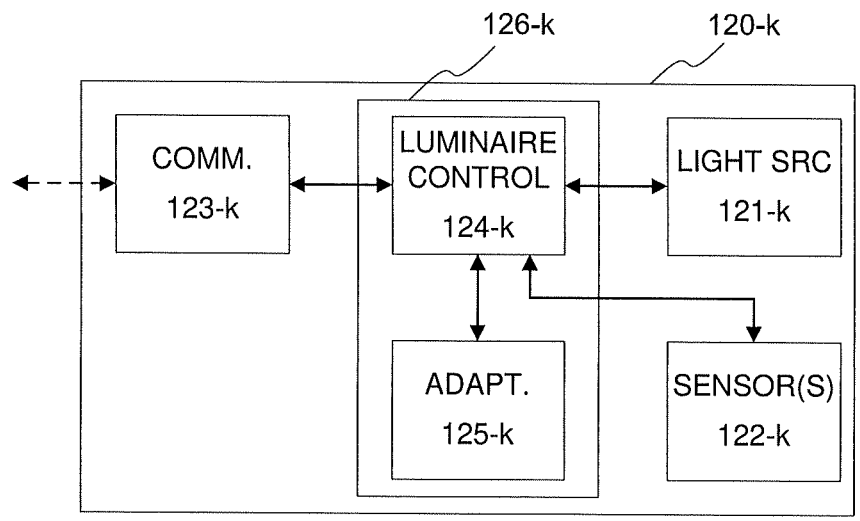
FIG. 2 illustrates a block diagram of some components of a luminaire according to an example.

FIG. 2 illustrates a block diagram of some (logical) components of a luminaire 120-$k$ according to an example. In the following, various characteristic of structure and operation of any of the plurality of luminaires 120 are described via references to the single luminaire 120-$k$, whereas these characteristics pertain to each of the plurality of luminaires 120, unless explicitly described otherwise. The luminaire 120-$k$ may comprise at least one light source 121-$k$ for providing light output of the luminaire 120-$k$, a sensor portion 122-$k$ for observing environmental characteristics at a location illuminated by the luminaire 120-$k$, a communication portion 123-$k$ for wireless communication with other elements of the lighting control network, a luminaire control portion 124-$k$ for controlling at least one aspect of operation of the luminaire 120-$k$ and an adaptation portion 125-$k$ for adjusting operation of the control portion 124-$k$ in accordance with its operating environment. The luminaire control portion 124-$k$ and the adaptation portion 125-$k$ may constitute, at least conceptually, a luminaire control apparatus 126-$k$.

According to an example, the at least one light source 121-$k$ may comprise one or more light emitting diodes (LEDs) and the luminaire control portion 124-$k$ may comprise or it may be provided as a LED driver device, whereas in another non-limiting example the at least one light source 121-$k$ may comprise one or more fluorescent lamps and the luminaire control portion 124-$k$ may comprise or it may be provided as an electronic ballast.

The sensor portion 122-$k$ may comprise one or more sensors arranged to observe respective environmental characteristics at the location of the luminaire 120-$k$. The one or more sensors of the sensor portion 122-$k$ may be communicatively coupled, e.g. via respective electrical wires, to the luminaire control portion 124-$k$ in order to provide respective sensor signals thereto. The one or more sensors of the sensor portion 122-$k$ may comprise e.g. one or more of the following:

an occupancy sensor for monitoring occupancy at the location of the sensor luminaire 120-$k$, e.g. a passive infrared (PIR) sensor, a microwave radar, a lidar, etc.;

a light sensor for measuring ambient light level at the location of the luminaire 120-$k$, e.g. photodetector such as photodiode;

a temperature sensor for measuring ambient temperature at the location of the luminaire 120-$k$;

a humidity sensor for measuring air humidity at the location of the luminaire 120-$k$;

a carbon dioxide ($CO_2$) sensor for measuring a $CO_2$ level at the location of the luminaire 120-$k$;

a volatile organic compound (VOC) sensor for measuring respective levels of one or more VOCs at the location of the luminaire 120-$k$.

The sensor data conveyed via the sensor signals from the sensor portion 122-$k$ to the luminaire control portion 124-$k$ may be referred to as local sensor data due to its local availability in the luminaire 120-$k$, whereas the local sensor data or a portion thereof may be applied by the luminaire control portion 124-$k$ for controlling the light output of the luminaire 120-$k$.

Along the lines described in the foregoing, the communication portion 123-$k$ may enable wireless communication with other elements of the lighting control network. In this regard, the communication portion 123-$k$ may comprise a respective communication apparatus, e.g. a wireless transceiver, that is capable of communicating with respective communication apparatuses provided in other elements of the lighting control network using one or more predefined wireless communication techniques or protocols. The wireless communication may be carried out via using a suitable short-range wireless communication technique known in the art that enables communication over ranges from a few meters up to a few hundred meters. Examples of suitable short-range wireless communication techniques include Bluetooth, Bluetooth Low-Energy (BLE), ZigBee, WLAN/Wi-Fi according to an IEEE 802.11 family of standards, etc. The choice of the wireless communication technique and network topology applied for a specific implementation of the lighting control network may depend e.g. on the required communication range and/or requirements with respect to energy-efficiency of the communication apparatuses.

The luminaire control portion 124-$k$ may control one or more aspects of light output of the at least one light source 121-$k$ in accordance with the local sensor data obtained from the sensor portion 122-$k$ and/or in accordance with status information received via the communication portion 123-$k$ from one or more other luminaires of the lighting system 100. In an example, the luminaire 120-$k$ may comprise an apparatus comprising a processor and a memory, where the memory is arranged to store computer program code that, when executed by the processor, causes the apparatus to operate as the luminaire control apparatus 126-$k$, thereby providing respective operations of the luminaire control portion 124-$k$ and the adaptation control portion 125-$k$ according to the present disclosure. More detailed examples of using the processor and the memory for implementing the luminaire control portion 124-$k$ are described later in this text with references to FIG. 6.

The luminaire 120-$k$ or an element thereof may have a device ID, e.g. an address, a serial number, a name, etc. assigned thereto. The device ID assigned to the luminaire 120-$k$ may be referred to as a luminaire ID of the luminaire 120-$k$. The luminaire ID may be stored, for example, in the memory provided in the luminaire 120-$k$ and it may be applied, for example, to identify the respective luminaire 120-$k$ in communication between elements of the lighting control network.

Along the lines described in the foregoing, the luminaire control portion 124-$k$ may control one or more aspects of light output of the at least one light source 121-$k$ in accordance with the local sensor data obtained from the sensor portion 122-$k$. In the course of its operation, the luminaire control portion 124-$k$ may record or derive sensor indications based on respective sensor signals received from the sensor portion 122-$k$, which may be referred to as local sensor indications since they are based on sensor data captured locally at the luminaire 120-$k$. The luminaire control portion 124-$k$ may arrange the local sensor indications into a respective time series of local sensor indications. Examples in this regard include deriving local occupancy state indications (i.e. respective indications of one of occupancy or non-occupancy) based on an occupancy sensor signal received from an occupancy sensor of the sensor portion 122-$k$ and/or deriving local light level indications based on a light sensor signal received from a light sensor of the sensor portion 122-$k$. Consequently, the light output of luminaire 120-$k$ may be controlled based at least in part on one or more time series of local sensor indications, e.g. on a time series of local occupancy state indications and/or on a time series of local light level indications.

The luminaire control portion 124-$k$ may apply a preprogrammed lighting control logic that defines controlling the light output of the luminaire 120-$k$ in accordance with the sensor data obtained from the sensor portion 122-$k$. As an example, the preprogrammed lighting control logic may define switching on the light output of the luminaire 120-$k$ as a response to the local sensor data indicating occupancy (after a period of non-occupancy) and define switching off the light output of the luminaire 120-$k$ as a response to the local sensor data indicating non-occupancy (after a period of occupancy). In this regard, the preprogrammed lighting control logic may include one or more predefined lighting control rules, where each lighting control rule may define a respective pair of a triggering condition and a lighting control action to be carried out as a response to an occurrence of the triggering condition, where the triggering condition may directly or indirectly pertain to one or more time series of local sensor indications. As a non-limiting example, the preprogrammed lighting control logic may define one or more of the following lighting control rules:

a first lighting control rule that defines switching on the light output of the luminaire 120-$k$ to a predefined target light intensity or otherwise adjusting the light output of the luminaire 120-$k$ from a lower light intensity to the predefined target light intensity as a response to the time series of local occupancy indications indicating a change of the occupancy state from non-occupancy to occupancy;

a second lighting control rule that defines adjusting the light output of the luminaire 120-$k$ (e.g. from the predefined target light intensity) to a predefined standby light intensity (e.g. switching off the light output of the luminaire 120-$k$) in accordance with a predefined dimming curve as a response to the time series of local occupancy indications indicating a change of occupancy state from occupancy to non-occupancy;

a third lighting control rule that defines increasing the light intensity applied for the light output of the luminaire 120-$k$ as a response to the time series of local light level indications indicating a light level that is below a target light level by more than a predefined margin;

a fourth lighting control rule that defines decreasing the light intensity applied for the light output of the luminaire 120-$k$ as a response to the time series of local light level indications indicating a light level that is above the target light level by more than the predefined margin.

The target light intensity, the stand-by light intensity, the target light level and the predefined margin referred to above are predefined lighting control parameters that may be set to respective predefined values e.g. upon manufacturing, installing, configuring or reconfiguring the luminaire 120-$k$. The predefined dimming curve referred to above may define adjustment of the light output from the predefined target light intensity to the stand-by lighting intensity via one or more predefined intermediate light intensities over a predefined dimming period, where parameters that characterize the predefined dimming curve (e.g. the intermediate light intensities and duration of the dimming period) may be likewise set upon manufacturing, installing, configuring or reconfiguring the luminaire 120-$k$. Moreover, to account for scenarios where the occupancy state remains unchanged, the preprogrammed lighting control logic may comprise respective lighting control rules for keeping on the light output of the luminaire 120-$k$ as a response to the time series of local occupancy indications indicating continued occupancy and/or for keeping off the light output of the luminaire 120-$k$ as a response to the time series of local occupancy indications indicating continued non-occupancy.

The luminaire control portion 124-$k$ may further operate the communication portion 122-$k$ to transmit (e.g. broadcast) status indication messages from the luminaire 120-$k$ to the other nodes of the lighting control network. A status indication message may comprise one or more status indications that are descriptive of an aspect of operational status of the luminaire 120-$k$, e.g. descriptive of an occurrence of an event pertaining to the luminaire 120-$k$ such as lighting control actions taken by the luminaire 120-$k$ and/or the local sensor indications recorded or derived in the luminaire control portion 124-$k$. Conversely, the luminaire control portion 124-$k$ may receive, via the communication portion 123-$k$, status indication messages (and hence status indications) from other ones of the plurality of luminaires 120. In this regard, a status indication transmitted from the luminaire 120-$k$ may comprise e.g. an action indication that identifies a lighting control action taken at the luminaire 120-$k$ or a sensor data indication that reports a current (or the most recent) sensor indication recorded or derived at the luminaire control portion 124-$k$. Non-limiting examples of action indications and sensor data indications include the following:

a first action indication that indicates switching on the light output of the luminaire 120-$k$ (to be transmitted e.g. due to a change of the occupancy state from non-occupancy to occupancy detected at the luminaire 120-$k$), a second action indication that indicates initiating adjustment of the light output of the luminaire 120-$k$ to the stand-by light intensity (to be transmitted e.g. due to a change in the occupancy state from occupancy to non-occupancy detected at the luminaire 120-$k$), a third action indication that indicates keeping on the light output of the luminaire 120-$k$ (to be transmitted e.g. due to continued occupancy detected at the luminaire 120-$k$), a fourth action indication that indicates keeping the light output of the luminaire 120-$k$ at the stand-by light intensity (to be transmitted e.g. due to continued non-occupancy detected at the luminaire 120-$k$);

an occupancy sensor data indication reporting the current (or the most recent) local occupancy state indication recorded or derived at the luminaire 120-$k$, a light sensor data indication reporting the current (or the most recent) local light level indication recorded or derived at the luminaire 120-$k$.

A status indication message may further comprise the luminaire ID assigned to the luminaire 120-$k$ transmitting the status indication message, thereby providing an identification of the luminaire 120-$k$ to which the status indication (s) conveyed in the status indication message pertain.

In the course of operation of the luminaire, the adaptation portion 125-$k$ may store, in the memory provided in the luminaire 120-$k$, history data that records a history of application of the one or more lighting control rules of the preprogrammed lighting control logic by the luminaire control portion 124-$k$. In this regard, the history data may comprise a history of occurrences of triggering conditions and the resulting lighting control actions the luminaire control portion 124-$k$ has taken as a response to the triggering conditions and a history of status indications received from other ones of the plurality luminaires 120 via the lighting control network. Moreover, the history data stored by the adaption portion 125-$k$ may further include a history of status indications transmitted from the luminaire 120-$k$ and possibly also a history of local sensor indications recorded or derived at the control portion 124-$k$. Each piece of history data may be stored together with respective timing information that indicates the capturing time and/or the transmission time of a respective piece of stored data (whichever applies). The timing information may comprise a respective timestamp that indicates time with respect to a predefined reference time.

The adaptation portion 125-$k$ may carry out a learning procedure via an analysis of the history data captured during an analysis period, e.g. during an a past time period of a predefined duration that precedes the analysis. In various examples, the analysis period may cover a period having a duration from a few minutes to a few weeks, depending on the size of the lighting system 100 and/or characteristics of the space the lighting system 100 serves to illuminate. The analysis may aim at determining an extent of operational relationship between the luminaire 120-$k$ and one or more other ones of the plurality of luminaires 120. In an example, the analysis with respect to a particular other luminaire 120-$p$ may involve deriving a respective relationship strength value that is descriptive of an extent of regularity at which detecting an occurrence of a given event pertaining to the particular other luminaire 120-$p$ (e.g. detecting occupancy at the location of the particular other luminaire 120-$p$) is followed by detecting occupancy at the location of the luminaire 120-$k$, where detecting occupancy may comprise detecting a change in the occupancy state at the respective location from non-occupancy to occupancy. Such operational similarity between the luminaire 120-$k$ and the particular other luminaire 120-$p$ may be considered as an indication of the luminaire 120-$k$ and the particular other luminaire 120-$p$ operating in a relatively close proximity to each other and hence serving to illuminate portions of the space that or relatively close to each other and/or that are relatively closely linked to each other in terms of movement of occupants of the space.

In an example, the learning procedure may involve the adaptation portion 125-$k$ carrying out the analysis with respect to one or more other ones of the plurality of luminaires in order to derive the respective relationship strength value for the one or more other ones of the plurality of luminaires 120, where the relationship strength value that pertains to the particular other luminaire 120-$p$ may be descriptive of an extent of regularity at which reception of a status indication that indicates an occurrence of the given event that pertains to (operation of) the particular other luminaire 120-$p$ is followed by detection of occupancy at the location of the luminaire 120-$k$. As an example in this regard, the given event that pertains to the (operation of) the particular other luminaire 120-$p$ may comprise one that is at least indirectly indicative of detection of a change in occupancy state from non-occupancy to occupancy at the location of the particular other luminaire 120-$p$, whereas detection of an occurrence of the given event having occurred at the particular other luminaire 120-$p$ may comprise e.g. the luminaire 120-$k$ receiving a given status indication from the particular other luminaire 120-$p$. Moreover, detection of occupancy at the location of the luminaire 120-$k$ may comprise e.g. identifying a change from non-occupancy to occupancy based on the time series of local occupancy indications recorded or derived at the luminaire control portion 124-$k$.

In an example, the given status indication that may be considered in derivation of the relationship strength value may be one that at least indirectly indicates a change from non-occupancy to occupancy observed at the particular other luminaire 120-$p$, e.g. one of the following:
- an action indication that indicates switching on the light output of the particular other luminaire 120-$p$, e.g. the first action indication described in the foregoing,
- an occupancy sensor data indication that indicates a change of occupancy state from non-occupancy to occupancy detected at the particular other luminaire 120-$p$.

The luminaire control portion 124-$k$ may operate the communication portion 123-$k$ to transmit the relationship strength values derived by the adaptation portion 125-$k$ via the lighting system gateway 140 to the lighting system server 150. This information may be transmitted from the luminaire 120-$k$ to the lighting system server 150 as relationship data, which may include the respective relationship strength values for one or more other ones of the plurality of luminaries 120 and luminaire IDs of the respective luminaries. The relationship data may include further information pertaining to one or more other luminaires of the plurality of luminaires 120 derived at the luminaire 120-$k$ (as described in more detail via examples provided in the following).

Along the lines described in the foregoing, the relationship strength value pertaining to the particular other luminaire 120-$p$ may be based on the history data, e.g. on the local occupancy indications recorded in the history data and on occasions of receiving the certain status indication originating from the particular other luminaire 120-$p$ recorded in the history data. In this regard, the relationship strength value that pertains the particular other luminaire 120-$p$ and that is derived based on occasions of receiving the given status indication from the particular other luminaire 120-$p$ may be derived in various ways, as far as it serves its purpose of indicating the extent of regularity at which reception of the given status indication from the particular other luminaire 120-$p$ is followed by detection of occupancy at the location of the luminaire 120-$k$ In this regard, a straightforward example for deriving the relationship strength value pertaining to the particular other luminaire 120-$p$ at the luminaire 120-$k$ is described in the following in order to illustrate certain exemplifying characteristics of the relationship strength values according to the present disclosure, whereas a more sophisticated non-limiting example regarding derivation of the relationship strength values is provided in paragraphs [0032] to [0056] of European patent publication no. 3171674 A1.

In general, in order to exhibit some extent of operational relationship between the luminaire 120-$k$ and the particular other luminaire 120-$p$ arising from these two luminaires operating in relatively close proximity of each other, detection of occupancy at the location of the luminaire 120-$k$ typically follows reception of the given status indication from the particular other luminaire 120-$p$ within a time window of certain duration. In this regard, depending on characteristics of operating environment of the lighting system 100, the time window may have a duration in a range from a few tenths of a second to a few tens of seconds. Consequently, a straightforward example to illustrate derivation and characteristics of the relationship strength value pertaining to the particular other luminaire 120-$p$ may involve
- determining $N_{all}$ as the number of all occasions of receiving the given status indication from the particular other luminaire 120-$p$ during the analysis period,
- determining $N_{flw}$ as the number of those occasions of receiving the given status indication from the particular other luminaire 120-$p$ during the analysis period that are followed by detection of occupancy at the location of the luminaire 120-$k$ within the time window of certain duration,
- deriving the relationship strength value based on a ratio of $N_{flw}$ to $N_{all}$.

In an example, the relationship strength value may be derived directly as the ratio of $N_{flw}$ to $N_{all}$, whereas in another example the relationship strength value may be derived as the ratio of $N_{flw}$ to $N_{all}$ further adjusted based on observed time margins between reception of the given status indication from the particular other luminaire 120-$p$ and detection of occupancy at the location of the luminaire 120-$k$ in different occasions of such a sequence of events occurring with the time window of the certain duration. An effect of the observed time margins to the resulting relationship strength value may include e.g. one or more of the following:
- the relationship strength value may increase with decreasing representative time margin and the relationship strength value may decrease with increasing representative time margin, where the representative time margin may be e.g. an average or median of observed time margins,
- the relationship strength value may increase with decreasing variance of observed time margins and the relationship strength may decrease with increasing variance of observed time margins.

Without losing generality, the relationship strength value may be considered as a value that is normalized into a predefined range that covers values from a predefined minimum value (e.g. zero) to a predefined maximum value (e.g. one), where a larger value indicates a higher extent of operational relationship between the luminaire 120-$k$ and the particular other luminaire 120-$p$.

According to an example, in addition to delivering the relationship strength values in the relationship data from the luminaire 120-$k$ via the lighting system gateway 140 to the lighting system server 150, the adaptation portion 125-$k$ may adjust some aspects of lighting control applied by the luminaire control portion 124-$k$ based on the relationship strength values. Such adaptation of operation of the luminaire control portion 124-$k$ may be provided via the adaptation portion 125-$k$ carrying out a first reprogramming procedure, which may involve supplementing the first preprogrammed lighting control logic of the luminaire control portion 124-$k$ in accordance with the respective relationship strength values derived for the one or more other ones of the plurality of luminaires 120. The first reprogramming procedure may comprise, for example, deriving, based on the relationship strength values derived in the adaptation portion 125-$k$, one or more supplementary lighting control rules for subsequent application by the luminaire control portion 124-$k$.

As an example, the first reprogramming procedure may involve defining a supplementary lighting control rule that defines switching on the light output of the luminaire 120-$k$ as a response to reception of a status indication that indicates an occurrence of the given event that pertains to the particular other luminaire 120-$p$, e.g. in response to receiving the given status indication from the particular other luminaire 120-$p$. Introduction of such a supplementary lighting control rule to the preprogrammed lighting control logic at the luminaire 120-$k$ creates an operational dependency between luminaire 120-$k$ and the particular other luminaire 120-$p$ via the luminaire 120-$k$ following the particular other luminaire 120-$p$ by switching or keeping on its light output in response to receiving the given status indication from the particular other luminaire 120-$p$, which may be transmitted therefrom in response to the particular other luminaire 120-$p$ detecting occupancy at its location or in response to the particular other luminaire 120-$p$ reacting to occupancy detected at its location via activating its light output. Hence, application of the first reprogramming procedure at the luminaire 120-$k$ may be considered as self-learning at the luminaire 120-$k$ due to relying on information collected from its operating environment in the course of its operation and due to being carried out without an involvement of an external control entity.

The first reprogramming procedure may involve the adaptation portion 125-$k$ selectively deriving a respective supplementary lighting control rule pertaining to one or more other ones of the plurality of luminaires 120 in dependence of the relationship strength values derived therefor. As an example in this regard, the adaption portion 125-$k$ may derive the supplementary lighting control rule for the particular other luminaire 120-$p$ in response to relationship strength value derived therefor exceeding a threshold value. Assuming an example where the relationship strength values are normalized into the range from 0 to 1, the threshold value may comprise a fixed predefined value selected e.g. from a range from 0.5 to 0.8.

As an example, the learning procedure (possibly followed by the reprogramming procedure) may be initiated in response to a user command received e.g. via a user interface of the luminaire 120-$k$ or in response to a specific control message received at the luminaire 120-$k$ via the communication portion 123-$k$. In the latter scenario, the control message may be transmitted (e.g. broadcast), e.g. from the lighting system gateway 140 under control of the lighting system server 150, to the plurality of luminaries 120 in order to initiate the learning procedure throughout the lighting system 100. In another example, the learning procedure may be automatically initiated after a predefined time period since installing, configuring or reconfiguring the luminaire 120-$k$ as part of the lighting system 100. The learning procedure may be repeated, for example in response to the user command or in response to a control message received via the communication portion 123-$k$. In another example, additionally or alternatively, the learning procedure may be automatically repeated according to a predefined schedule, e.g. at predefined time intervals, or the learning procedure may be carried out substantially continuously e.g. via usage of a sliding window to define the analysis period.

In a further example, the learning procedure may be repeated according to a predefined schedule with usage of an analysis period having a duration that increases from an initial duration from one learning procedure to another until reaching a predefined maximum duration, e.g. such that the time interval between consecutive learning procedures is gradually increased and/or that the applied analysis period is gradually increased. As an example in this regard, the initial learning procedure may apply a very short analysis period (e.g. a few minutes) while the learning procedure may be first repeated at relatively short time intervals (e.g. once in a few hours or daily) with gradually increasing analysis period duration when more history data becomes available, whereas subsequent repetitions of the learning procedure may be carried out at longer time intervals (e.g. once a week or once a month) using analysis period of the predefined maximum duration.

Referring back to the supplementary lighting control rule pertaining to the particular other luminaire 120-$p$ that may be defined via the first reprogramming procedure for the lighting control logic applied by the luminaire control portion 124-$k$, in an example, the lighting control action of the supplementary lighting control rule may involve switching on the light output of the luminaire 120-$k$ at the predefined target light intensity, whereas the luminaire 120-$k$ may report taking this lighting control action to other elements of the lighting control network via using a dedicated status indication, e.g. a fifth action indication that indicates switching on the light output of the luminaire 120-$k$ due to the luminaire 120-$k$ following the particular other luminaire 120-$p$. The fifth action indication may further include information that defines the particular other luminaire 120-$p$ whose activation has triggered switching on the light output of the luminaire 120-$k$ and possibly also the relationship strength value derived for the particular other luminaire 120-$p$ as part of the learning procedure at the luminaire 120-$k$.

Application of the fifth action indication to report application of the supplementary lighting control rule in the particular other luminaire 120-$p$ enables the luminaire 120-$k$ to distinguish between the particular other luminaire 120-$p$ switching on its light output due to detecting occupancy at its location and the particular other luminaire 120-$p$ switching on its light output due to following activation of a further luminaire, which may occur due to the learning procedure and the first reprogramming procedure having been carried out in the particular other luminaire 120-$p$. Hence, usage of the fifth action indication (instead of the first action indication) has e.g. the following advantages:

the luminaire control portion 124-$k$ is able to correctly apply the supplementary lighting control rule to switch on its light output in response to the particular other luminaire 120-$p$ switching on its light output due to detecting occupancy at its location instead of the luminaire control portion 124-$k$ (also) activating the light output in response to the particular other luminaire 120-$p$ switching its light output due to following activation of the further luminaire;

a subsequent learning procedure via operation of the adaptation portion 125-$k$ is able to distinguish between any of the other ones of the plurality of luminaires 120 switching on its light output due to detecting occupancy at its location and the respective other luminaire switching on its light output due to following activation of the further luminaire.

In another example of configuring the supplementary lighting control rule pertaining to the particular other luminaire 120-$p$, the lighting control action of the supplementary lighting control rule may involve switching on the light output of the luminaire 120-$k$ in a manner different from that arising from operation of the first lighting control rule described above while making use of the first action indication to report application of this lighting control action to other elements of the lighting control network. Non-limiting examples in this regard include the following:

the lighting control action of the supplementary lighting control rule may involve switching on the light output of the luminaire 120-$k$ to a secondary target light intensity that is different from (e.g. lower than) the predefined target light intensity applied when switching on the light output via operation of the first lighting control rule;

the lighting control action of the supplementary lighting control rule may involve switching on the light output of the luminaire 120-$k$ to the predefined target light intensity or to another (e.g. lower) light intensity via a ramp-up curve different from that applied when switching on the light output via operation of the first lighting control rule.

In an example, the secondary target light intensity may be set to a value that is a predefined percentage (e.g. in a range from 50% to 80%) of the predefined target light intensity, whereas in another example the secondary target light intensity may comprise a value that is proportional to the relationship strength value derived for the particular other luminaire 120-$p$. As an example of the latter, assuming that the relationship strength values are normalized into the range from 0 to 1, the secondary target light intensity may be derived via multiplying the predefined target light intensity by the relationship strength value derived for the particular other luminaire 120-$p$. In an example, the ramp-up curve applied in switching on the light output of the luminaire 120-$k$ via operation of the supplementary lighting control rule may define increasing the light intensity to the applicable target light intensity slower (e.g. over a longer time period) than when switching on the light output via operation of the first lighting control rule.

Hence, in this example the luminaire 120-$k$ is able to distinguish between the particular other luminaire 120-$p$ switching on its light output due to detecting occupancy at its location and the particular other luminaire 120-$p$ switching on its light output due to following activation of a further luminaire via further observing the change in light level at the location of the luminaire 120-$k$ (e.g. based on the local light level indications available in the luminaire 120-$k$) upon receiving the given status indication. This is applicable both for carrying out a subsequent learning procedure in the luminaire 120-$k$ and in application of the supplementary lighting control rule in the luminaire 120-$k$.

In the course of the learning procedure the adaptation portion 125-$k$ may further derive a respective distance measure for the one or more other ones of the plurality of luminaires 120. A distance measure that pertains to the particular other luminaire 120-$p$ may be descriptive of a distance between the luminaire 120-$k$ and the particular other luminaire 120-$p$ and it may be computed based on respective distance values derived for one or more messages received at the luminaire 120-$k$ from the particular other luminaire 120-$p$, e.g. as a statistical measure such as a minimum, an average, a median or a maximum of distance values under consideration. An example of an applicable distance measure comprises a received signal strength indication (RSSI) measure computed based on respective RSSI values derived for individual status messages received from the particular other luminaire 120-$p$. In this regard, a RSSI measure having a high(er) value typically implies a short(er) distance between the luminaire 120-$k$ and the particular other luminaire 120-$p$ while a RSSI measure having a low(er) value typically implies a long(er) distance between the luminaire 120-$k$ and the particular other luminaire 120-$p$, the RSSI measure thereby serving as an indication of the distance between these two elements of the lighting control network e.g. in scenarios where the luminaire 120-$k$ receives the status messages directly from the particular other luminaire 120-$p$ (i.e. without the status messages being relayed by intermediate nodes of the lighting control network).

Another example of an applicable distance measure comprises a hop count measure computed based on hop counts observed for individual status messages originating from the particular other luminaire 120-$p$ (e.g. received in header parts of respective status messages originating from the particular other luminaire 120-$p$). In this regard, a low hop count measure indicates a short(er) distance between the luminaire 120-$k$ and the particular other luminaire 120-$p$ while a high hop count measure indicates a long(er) distance between the luminaire 120-$k$ and the particular other luminaire 120-$p$, and, consequently, the hop count measure may serve as indication of the distance between the luminaire 120-$k$ and the particular other luminaire 120-$p$ e.g. in scenarios where the status messages originating from the particular other luminaire 120-$p$ are relayed to the luminaire 120-$k$ via one or more intermediate nodes of the lighting control network (e.g. via a mesh network).

The adaptation portion 125-$k$ may operate the communication portion 123-$k$ to transmit the distance measures derived by the adaptation portion 125-$k$ via the lighting system gateway 140 to the lighting system server 150. This information may be transmitted from the luminaire 120-$k$ to the lighting system server 150 as part of the relationship data described in the foregoing. Hence, the relationship data may further include the respective distance measure derived for the one or more other ones of the plurality of luminaires 120 together with the luminaire IDs of the respective luminaries.

Figure 3:
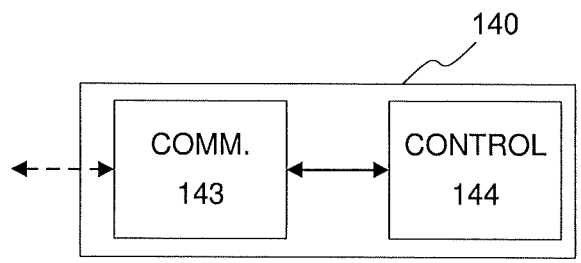
FIG. 3 illustrates a block diagram of some components of a lighting system gateway according to an example.

FIG. 3 illustrates a block diagram of some (logical) components of the lighting system gateway 140 according to an example, comprising a communication portion 143 and a control portion 144. The communication portion 143 may be provided for wireless communication with other elements of the lighting control network (e.g. the plurality of luminaires 120) and for wireless or wired communication with the lighting system server 150. The control portion 144 may be provided for controlling at least some aspects of operation of the lighting system gateway 140 in terms of facilitating lighting control within the lighting system 100. In an example, the lighting system gateway 140 may comprise an apparatus comprising a processor and a memory, where the memory is arranged to store computer program code that, when executed by the processor, causes the apparatus to operate as the control portion 144 of the lighting system gateway 140 according to the present disclosure. More detailed examples of using the processor and the memory for implementing the luminaire lighting system gateway 140 are described later in this text with references to FIG. 6.

According to an example, the control portion 144 of the lighting system gateway 140 may receive, via the communication portion 143, the respective relationship data from the plurality of luminaires and relay, via the communication portion 143, the received relationship data to the lighting system server 150 for processing therein. Moreover, the control portion 144 may receive, via the communication portion 143, dependency control information from the lighting system server 150 and relay, via the communication portion 153, the dependency control information to the plurality of luminaires 120.

Figure 4:
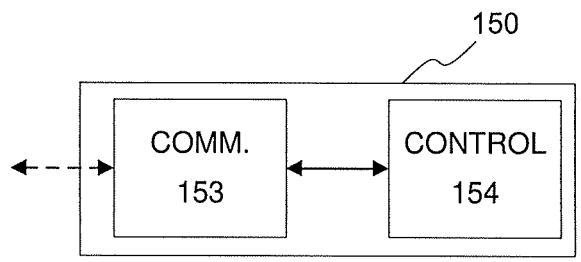
FIG. 4 illustrates a block diagram of some logical components of a lighting system server according to an example.

FIG. 4 illustrates a block diagram of some (logical) components of the lighting system server 150 according to an example, comprising a communication portion 153 for wireless or wired communication with other apparatuses, e.g. with the lighting system server 140, and a control portion 154 for processing the respective relationship data received via the lighting system gateway 140 from the plurality of luminaires 120. In this regard, the control portion 154 may receive, via the communication portion 153, respective relationship data originating from the plurality of luminaires 120, control at least one aspect of operational dependencies among the plurality of luminaires 120 in accordance with the relationship data received therein, and transmit, via the communication portion 153, dependency control information derived therein via the lighting system gateway 140 to the plurality of luminaires 120.

In an example, the lighting system server 150 may comprise a logical entity implemented by one or more apparatuses that each comprise a processor and a memory, where the memory at each of the one or more apparatuses is arranged to store a respective computer program code that, when executed by the processor of the respective apparatus, causes the one or more apparatuses to jointly operate as the control portion 154 of the lighting system server 150 according to the present disclosure. More detailed examples of using the processor and the memory for implementing such an apparatus are described later in this text with references to FIG. 6.

In an example, some aspects of operation of the lighting system 100 may be configured based on the respective relationship data derived at the plurality of luminaires 120 via operation of the control portion 154 of the lighting system server 150. Such lighting system configuration may be carried out, for example, via implementing a method 200 illustrated in FIG. 5, where the method 200 may comprise the following steps carried out in at least some luminaires of the plurality of luminaires 120:

controlling the light output of a respective luminaire 120-*k* in accordance with the preprogrammed lighting control logic that defines switching on the light output of the respective luminaire 120-*k* in response to detecting occupancy at location of the respective luminaire 120-*k* (block 202);

transmitting status indications to other ones of the plurality of luminaires 120 and receiving status indications from other ones of the plurality of luminaires 120, wherein each status indication is descriptive of an occurrence of an event pertaining to a luminaire transmitting the respective status indication (blocks 204*a* and 204*b*);

deriving the relationship data including one or more relationship strength values, wherein each relationship strength value pertains to a particular other luminaire 120-*p* of the plurality of luminaires 120 and is descriptive of an extent of regularity at which reception of a status indication that indicates an occurrence of a given event that pertains to the particular other luminaire 120-*p* is followed by detection of occupancy at the location of the respective luminaire 120-*k*; (block 206); and transmitting the relationship data to the lighting system server 150; (block 208), Moreover, the method 200 may further comprise controlling, in the lighting system server 150, at least one aspect of operational dependencies among the plurality of luminaires 120 in accordance with the respective relationship data received from the plurality of luminaires 120 (block 210).

The respective operations described with references to the method steps represented by blocks 202 to 210 may be varied or complemented in a number of ways, e.g. according to the examples described in the foregoing and/or in the following in context of describing respective characteristics of operation of the plurality of luminaires 120 (predominantly via references to the luminaire 120-*k*) and/or the lighting system server 150. Moreover, the method 200 may be complemented with one or more additional steps, the order of carrying out at least some of the method steps may be different from that depicted in FIG. and/or some of the steps may be omitted without departing from the scope of the lighting system configuration procedure described in the present disclosure.

Referring now to operations that pertain to block 210, the aspect of the control portion 154 of the lighting system server 150 controlling operational dependencies among the plurality of luminaires 120 may involve the control portion 154 carrying out, for example, one of the following:

determining a respective luminaire group for at least one of the plurality of luminaires 120 based on the relationship data received from the plurality of luminaires 120, preventing, based on the relationship data received from the plurality of luminaires 120, an operational dependency between one or more pairs of luminaires among the plurality of luminaires 120, creating, based on the relationship data received from the plurality of luminaires 120, respective one or more further operational dependencies for at least one of the plurality of luminaires 120.

In a first scenario, operations that pertain to block 210 may comprise the control portion 154 in the lighting system server 150 determining a respective luminaire group for at least one luminaire of the plurality of luminaires 120 based on the respective relationship strength values received from the plurality of luminaires 120 in the respective relationship data, thereby determining the one or more luminaire groups for the lighting system 100. In general, two luminaires that have reported a relatively high relationship strength values pertaining to each other may be assigned to the same luminaire group. As an example, this may involve the control portion 154 determining the luminaire group for the luminaire 120-*k* based on respective relationship strength values reported for one or more other luminaires of the lighting system 100 by the respective luminaire 120-*k* and on respective relationship strength values reported for the respective luminaire 120-*k* by said one or more other luminaires.

In an example in this regard, the control portion 154 may assign those luminaires that have reported for the luminaire 120-*k* a relationship strength value that exceeds a grouping threshold and for which the luminaire 120-*k* has reported a relationship strength value that exceeds the grouping threshold into a luminaire group of the luminaire 120-$k$. Assuming an example where the relationship strength values are normalized into the range from 0 to 1, the grouping threshold may be a fixed predefined value selected e.g. from a range from 0.5 to 0.8. Such an approach may result in determining for the luminaire 120-$k$ a luminaire group including one or more other luminaires that are all are in relatively close proximity of the luminaire 120-$k$. In another example, the control portion 154 may apply a clustering algorithm known in the art, such as minimum-cut method, hierarchical clustering or Girvan-Newman algorithm, for identifying possible community structures among the plurality of luminaire and, consequently, for determining the luminaire group for the luminaire 120-$k$.

Such an approach may allow for determining for the luminaire 120-$k$ a luminaire group that includes luminaire that are (also) further away from the luminaire 120-$k$ but that still exhibit a significant operational relationship with the luminaire 120-$k$, The resulting luminaire groups are symmetric in that if the luminaire 120-$k$ has the particular other luminaire 120-$p$ assigned to its luminaire group, the particular other luminaire 120-$p$ has the luminaire 120-$k$ assigned to its luminaire group. Depending on the relationship strength values determined by the luminaire 120-$k$ to one or more other ones of the plurality of luminaries 120 and the respective relationship strengths determined for the luminaire 120-$k$ by the one or more other ones of the plurality of luminaries 120, the luminaire 120-$k$ may be assigned into respective luminaire groups of more than one other luminaires and it may have one or more other luminaires assigned to its luminaire group, whereas the luminaire 120-$k$ does not necessarily belong to a respective luminaire group any of the other luminaires and/or the luminaire 120-$k$ does not necessarily have a luminaire group determined therefor.

Still referring to the first scenario, operations that pertain to block 210 may comprise the control portion 154 operating the communication portion 153 to transmit, via the lighting system gateway 140 to the plurality of luminaires 120, dependency control information that includes information that defines the luminaire groups determined at the lighting system server 150. Hence, each luminaire of the lighting system 100 for which a respective luminaire group has been determined via operation of the control portion 154 of the lighting system server 150 receives information of the respective luminaire group determined therefor. Consequently, in response to receiving the information of the luminaire group determined therefor, the adaptation portion 125-$k$ in the luminaire 120 may carry out a second reprogramming procedure that may involve deriving one or more further lighting control rules for subsequent application by the luminaire control portion 124-$k$.

As an example, the second reprogramming procedure may involve defining one or more further lighting control rules that define switching on the light output of the luminaire 120-$k$ as a response to reception of a status indication that indicates an occurrence of the given event that pertains to any of the other luminaires assigned to the luminaire group determined for the luminaire 120-$k$, e.g. in response to receiving a status indication that at least indirectly indicates a change from non-occupancy to occupancy observed at any of the other luminaires assigned to the luminaire group determined for the luminaire 120-$k$. In this regard, the status indication under consideration may comprise e.g. one of the following:

an action indication that indicates switching on the light output received from any other luminaire assigned to the luminaire group determined for the luminaire 120-$k$, e.g. the first action indication described in the foregoing, an occupancy sensor data indication that indicates a change of occupancy state from non-occupancy to occupancy received from any other luminaire assigned to the luminaire group determined for the luminaire 120-$k$.

Introduction of such one or more further lighting control rules to the preprogrammed lighting control logic at the luminaire 120-$k$ creates a respective operational dependency between luminaire 120-$k$ and the one or more luminaires assigned to the luminaire group determined for the luminaire 120-$k$ via the luminaire 120-$k$ following the other luminaires of this luminaire group by activating its light output in response to any of the other luminaires assigned to this luminaire group detecting occupancy at its respective location and/or in response to any of the other luminaires assigned to this luminaire group reacting to occupancy detected at its respective location via activating its light output.

The respective lighting control actions applied by the one or more further lighting control rules may be similar to that applied by the supplementary lighting control rule described in the foregoing, mutatis mutandis. In particular, in an example, the lighting control action of a further lighting control rule may involve switching on the light output at the predefined target light intensity and reporting application of this lighting control action to other elements of the lighting control network via usage of the dedicated action indication, e.g. the fifth action indication described above, whereas in another example, the lighting control action of a further lighting control rule may involve switching on the light output in a manner different from that arising from operation of the first lighting control rule and reporting application of the lighting control action of the further lighting control rule to other elements of the lighting control network via usage of the first action indication or the dedicated action indication (e.g. the fifth action indication described above).

The second reprogramming procedure may further involve the adaptation portion 125-$k$ deleting, disabling or deactivating the one or more supplementary lighting control rules possible introduced earlier to supplement the preprogrammed lighting logic applied by the luminaire control portion 124-$k$ via operation of the first reprogramming procedure, thereby removing or deleting the operational dependencies possibly created via operation of the first reprogramming procedure.

In a second scenario, operations that pertain to block 210 may comprise the control portion 154 in the lighting system server 150 preventing an operational dependency between one or more pairs of luminaires among the plurality of luminaires 120 based on the respective distance measures received from the plurality of luminaires 120 in the respective relationship data. In this regard, as described in the foregoing, the relationship data received from the luminaire 120-$k$ may comprise the respective distance measure pertaining to one or more other ones of the plurality of luminaires, whereas the control portion 154 may prevent operational dependencies between two luminaires for which the distance measures received in the relationship indicate a distance that exceeds a distance threshold. Preventing an operational dependency between a certain pair of luminaires may comprise cancelling or removing an existing operational dependency defined for the certain pair of luminaires or preventing creation of an operational dependency for the certain pair of luminaires. Such prevention of operational dependency may enable avoiding a first luminaire creating or maintaining an operational dependency on a second luminaire e.g. in scenarios where the second luminaire is located at a substantial distance from the first luminaire, where the second luminaire is located in a different floor of a building than the first luminaire and/or where a wall or a corresponding structure separates the second luminaire from the first luminaire. Preventing an operational dependency of the first luminaire on the second luminaire may be considered as 'blacklisting' of the second luminaire for the first luminaire.

As an example in this regard, the control portion 154 may prevent an operational dependency of the luminaire 120-$k$ on the particular other luminaire 120-$p$ in case the distance measure pertaining to the particular other luminaire 120-$p$ reported by the luminaire 120-$k$ suggests a distance that exceeds the distance threshold and/or in case the in case the distance measure pertaining to luminaire 120-$k$ reported by the particular other luminaire 120-$p$ suggests a distance that exceeds the distance threshold. Prevention of the operational dependency may involve cancellation or removal of an operational dependency defined in the luminaire 120-$k$ as a consequence of the first reprogramming procedure applied therein (e.g. via removal of one or more supplementary lighting control rules derived via self-learning at the luminaire 120-$k$) or cancellation or removal of an operational dependency defined in the luminaire 120-$k$ as a consequence of the second reprogramming procedure applied therein (e.g. via removal of one or more further lighting control rules derived in the luminaire 120-$k$ for implementing the luminaire group determined therefor by the lighting system server 150). Moreover, prevention of the operational dependency may involve excluding a certain luminaire from consideration in derivation of the luminaire group for the luminaire 120-$k$ by the control portion 154 of the lighting system server 150.

In case RSSI-based distance estimation is applied at the plurality of luminaires 120, the distance threshold may comprise a RSSI threshold value and the control portion 154 may prevent the operational dependency of the luminaire 120-$k$ on the particular other luminaire 120-$p$ in response to one of following:
- the RSSI measure pertaining to the particular other luminaire 120-$p$ reported by the luminaire 120-$k$ failing to exceed the RSSI threshold value,
- the RSSI measure pertaining to the luminaire 120-$k$ reported by the particular other luminaire 120-$p$ failing to exceed the RSSI threshold value,
- any of the RSSI measure pertaining to the particular other luminaire 120-$p$ reported by the luminaire 120-$k$ or the RSSI measure pertaining to the luminaire 120-$k$ reported by the particular other luminaire 120-$p$ failing to exceed the RSSI threshold value,
- both the RSSI measure pertaining to the particular other luminaire 120-$p$ reported by the luminaire 120-$k$ and the RSSI measure pertaining to the luminaire 120-$k$ reported by the particular other luminaire 120-$p$ failing to exceed the RSSI threshold value.

In an example, the RSSI threshold value may comprise a fixed predefined value, whereas in another example the RSSI threshold value may comprise a value derived based RSSI measures reported by the luminaire 120-$k$ and/or reported for the luminaire 120-$k$ by other ones of the plurality of luminaires 120. As an example of the latter, the RSSI threshold value may be derived as predefined percentage of the highest RSSI measure reported by the luminaire 120-$k$ for any of the other ones of the plurality of luminaires 120 and/or reported for the luminaire 120-$k$ by any of the other ones of the plurality of luminaires 120.

In case hop-count-based distance estimation is applied at the plurality of luminaires 120, the distance threshold may comprise a hop count threshold and the control portion 154 may prevent the operational dependency of the luminaire 120-$k$ on the particular other luminaire 120-$p$ in response to one of following:
- the hop count measure pertaining to the particular other luminaire 120-$p$ reported by the luminaire 120-$k$ exceeding the hop count threshold,
- the hop count measure pertaining to the luminaire 120-$k$ reported by the particular other luminaire 120-$p$ exceeding the hop count threshold,
- any of the hop count measure pertaining to the particular other luminaire 120-$p$ reported by the luminaire 120-$k$ or the hop count measure pertaining to the luminaire 120-$k$ reported by the particular other luminaire 120-$p$ exceeding the hop count threshold,
- both the hop count measure pertaining to the particular other luminaire 120-$p$ reported by the luminaire 120-$k$ and the hop count measure pertaining to the luminaire 120-$k$ reported by the particular other luminaire 120-$p$ exceeding the hop count threshold.

In an example, the hop count threshold may comprise a fixed predefined threshold, whereas in another example the hop count threshold may comprise a value derived based hop count measures reported by the luminaire 120-$k$ and/or reported for the luminaire 120-$k$ by other ones of the plurality of luminaires 120. As an example of the latter, the hop count threshold may be derived as predefined percentage of the highest hop count measure reported by the luminaire 120-$k$ for any of the other ones of the plurality of luminaires 120 and/or reported for the luminaire 120-$k$ by any of the other ones of the plurality of luminaires 120.

Still referring to the second scenario, operations that pertain to block 210 may comprise the control portion 154 operating the communication portion 153 to transmit, via the lighting control gateway 140 to the plurality of luminaires 120, dependency control information that defines one or more operational dependencies to be prevented at one or more of the plurality of luminaires 120. Hence, each luminaire of the lighting system 100 that is to prevent one or more operational dependencies on a certain other luminaire may receive the information in this regard and take necessary action therein. Consequently, in an example, in response to receiving the information of the one or more operational dependencies to be prevented therein, the adaptation portion 125-$k$ in the luminaire 120-$k$ may carry out a third reprogramming procedure that may involve deleting, disabling or inactivating any supplementary lighting control rules and/or further lighting control rules possibly defined therein accordingly for subsequent operation of the luminaire control portion 124-$k$.

In a third scenario, operations that pertain to block 210 may comprise the control portion 154 in the lighting system server 150 creating or introducing one or more respective further operational dependencies for one or more luminaires of the lighting system 100, wherein creation or introduction of the one or more further operational dependencies may be based on the respective relationship strength values received from the plurality of luminaires 120 in the respective relationship data.

As an example in this regard, the control portion 154 may identify a situation where the luminaire 120-$k$ has reported a relatively high relationship strength value for the particular other luminaire 120-*p* while the particular other luminaire 120-*p* has reported a relatively low relationship value for the luminaire 120-*k* and create, for the luminaire 120-*k* an operational dependency on the particular other luminaire 120-*p*. Such an operation accounts e.g. for a scenario where the particular other luminaire 120-*p* is located in a first space (e.g. in a room) accessible via a second space (e.g. a corridor, a lobby, a staircase, etc.) and the luminaire 120-*k* is located in the second space relatively close to an entrance to the first space. Consequently, it may be advantageous to keep the second space illuminated (at least to some extent) when the first space is occupied to ensure illumination in the second space when a person exits from the first space to the second space.

In an example, the control portion 154 may implement the above-described operation via creating the further operational dependency for the luminaire 120-*k* in response to
- the relationship strength value for the particular other luminaire 120-*p* reported by the luminaire 120-*k* exceeding a first threshold, and
- the relationship strength value for the luminaire 120-*k* reported by the particular other luminaire 120-*p* failing to exceed a second threshold that is lower than the first threshold.

Herein, the first threshold may be the same as or the similar to the grouping threshold described in the foregoing, whereas the second threshold may have a substantially lower value. Assuming an example where the relationship strength values are normalized into the range from 0 to 1, the second threshold may be a fixed predefined value selected e.g. from a range from 0.1 to 0.2.

Still referring to the third scenario, operations that pertain to block 210 may comprise the control portion 154 operating the communication portion 153 to transmit, via the lighting system gateway 140 to the plurality of luminaires 120, dependency control information that defines one or more further operational dependencies to be introduced at one or more of the plurality of luminaires 120. Hence, each luminaire of the lighting system 100 that is to introduce one or more further operational dependencies determined therefor may receive information of the operational dependencies to be introduced. Consequently, in response to receiving the information of the one or more operational dependencies to be introduced therein, the adaptation portion 125-*k* in the luminaire 120-*k* may carry out a fourth reprogramming procedure that may involve introducing one or more additional lighting control rules for subsequent operation of the luminaire control portion 124-*k*. In this regard, an additional lighting control rule pertaining to the particular other luminaire 120-*p* may define switching on and/or keeping on the light output of the luminaire 120-*k* as a response to reception of a status indication that indicates an occurrence of a given event that pertains to the particular other luminaire 120-*p*, e.g. in response to receiving a status indication that at least indirectly indicates detecting occupancy at the location of the particular other luminaire 120-*p*. As an example in this regard, the additional lighting control rule pertaining to the particular other luminaire 120-*p* may define switching on and/or keeping on the light output of the luminaire 120-*k* as a response to receiving one of the following from the particular other luminaire 120-*p*:
- an action indication that indicates switching on the light output of the particular other luminaire 120-*p*, e.g. the first action indication described in the foregoing,
- an action indication that indicates keeping on the light output of the particular other luminaire 120-*p*, e.g. the third action indication described in the foregoing,
- an occupancy sensor data indication that indicates occupancy detected at the particular other luminaire 120-*p*.

In another example, additionally or alternatively, an additional lighting control rule pertaining to the particular other luminaire 120-*p* introduced via the fourth reprogramming procedure may define switching on and/or keeping on the light output of the luminaire 120-*k* as a response to reception of a status indication that indicates an occurrence of a second given event that pertains to the particular other luminaire 120-*p*, e.g. in response to detecting a change in occupancy state from occupancy to non-occupancy at the location of the particular other luminaire 120-*p*. As an example in this regard, the additional lighting control rule pertaining to the particular other luminaire 120-*p* may define switching on and/or keeping on the light output of the luminaire 120-*k* as a response to receiving one of the following from the particular other luminaire 120-*p*:
- an action indication that indicates initiating adjustment of the light output of the particular other luminaire 120-*p* to the stand-by light intensity, e.g. the second action indication described in the foregoing,
- an occupancy sensor data indication that indicates a change of occupancy state from occupancy to non-occupancy detected at the particular other luminaire 120-*p*.

In an example, introduction of the additional lighting control rule pertaining to the particular other luminaire 120-*p* for the luminaire 120-*k* via the fourth reprogramming procedure may be dependent on the light output of the particular other luminaire 120-*p* being visible to (the location of) the luminaire 120-*k* and/or the light output of the luminaire 120-*k* being visible to (the location of) the particular other luminaire 120-*p*. As an example in this regard, the luminaire control portion 124-*k* in the luminaire 120-*k* may detect the particular other luminaire 120-*p* being visible thereto in response to the local light level indications derived at the luminaire 120-*k* (and recorded in the history data therein) indicating an increase in light level that exceeds a predefined threshold upon the particular other luminaire 120-*p* switching on its light output. In another example, the particular other luminaire 120-*p* may detect visibility of the luminaire 120-*k* therein in a similar manner and report the visibility or non-visibility of the luminaire 120-*k* therein e.g. via a transmitting a message to the luminaire 120-*k* via the lighting control network.

In the foregoing, the aspect of controlling at least one aspect of operational dependencies among the plurality of luminaires 120 (cf. block 210 of the method 200) is described as an operation carried out via operation of the control portion 154 of the lighting system server 150. This is, however, a non-limiting example and in other examples such control of operational dependences among the plurality of luminaires 120 may be implemented via operation of the lighting control gateway 140 or jointly via respective operation of the lighting control gateway 140 and the lighting system server 150. Consequently, the aspect of controlling at least one aspect of operational dependencies among the plurality of luminaires 120 may be carried out by a lighting system control entity, which may comprise the lighting system gateway 140 and/or the system server 150.

The lighting system configuration described in the foregoing via a number of examples provides automated control over at least some aspects of operational dependencies among the plurality of luminaires 120 of the lighting system

100 by controlling the operational dependencies via operating the luminaires 120-*k* of the lighting system 100 in their actual operating environment, which ensures basing the operational dependencies among the plurality of luminaires 120 on (relationship) data obtained in actual operating conditions of the lighting system 100. Hence, the disclosed approach does not only enable avoiding tedious manual configuration of the operational dependencies among the plurality of luminaires 120 but also facilitates controlling the operational dependencies in a manner that ensures user comfort due to sufficient lighting in locations of the illuminated space where one or more occupants are detected and/or where one or more occupants are expected to move.

While the lighting system configuration procedure is described in the foregoing as a stand-alone procedure, the automated procedure via operation of the method 200 may be, alternatively, complemented by manual configuration of operational dependencies between some of the plurality of luminaires 120.

Figure 6:
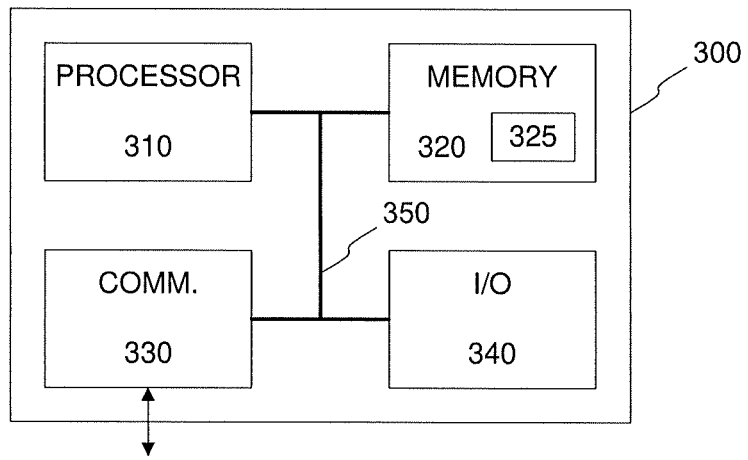
FIG. 6 illustrates a block diagram of some components of an apparatus according to an example.

FIG. 6 illustrates a block diagram of some components of an apparatus 300 that may be employed to implement at least some of the operations described with references to the luminaire control apparatus 126-*k*, with references to the control portion 144 or with reference to the control portion 154. The apparatus 300 comprises a processor 310 and a memory 320. The memory 320 may store data and computer program code 325. The apparatus 300 may further comprise communication means 330 for wired or wireless communication with other apparatuses, where the communication means 330 may comprise respective one of the communication portion 123-*k*, the communication portion 143 or the communication portion 153. The apparatus 300 may further comprise user I/O (input/output) components 340 that may be arranged, together with the processor 310 and a portion of the computer program code 325, to provide a user interface for receiving input from a user and/or providing output to the user. In particular, the user I/O components may include user input means, such as one or more keys or buttons, a keyboard, a touchscreen or a touchpad, etc. The user I/O components may include output means, such as a display or a touchscreen. The components of the apparatus 300 are communicatively coupled to each other via a bus 350 that enables transfer of data and control information between the components.

The memory 320 and a portion of the computer program code 325 stored therein may be further arranged, with the processor 310, to cause the apparatus 300 to perform at least some aspects of operation of the respective one of the luminaire control apparatus 126-*k*, the control portion 144 or the control portion 154. The processor 310 is configured to read from and write to the memory 320. Although the processor 310 is depicted as a respective single component, it may be implemented as respective one or more separate processing components. Similarly, although the memory 320 is depicted as a respective single component, it may be implemented as respective one or more separate components, some or all of which may be integrated/removable and/or may provide permanent/semi-permanent/dynamic/cached storage.

The computer program code 325 may comprise computer-executable instructions that implement at least some aspects of operation of the respective one of the luminaire control apparatus 126-*k*, the control portion 144 or the control portion 154 when loaded into the processor 310. As an example, the computer program code 325 may include a computer program consisting of one or more sequences of one or more instructions. The processor 310 is able to load and execute the computer program by reading the one or more sequences of one or more instructions included therein from the memory 320. The one or more sequences of one or more instructions may be configured to, when executed by the processor 310, cause the apparatus 300 to perform at least some aspects of operation of respective one of the luminaire control apparatus 126-*k*, the control portion 144 or the control portion 154. Hence, the apparatus 300 may comprise at least one processor 310 and at least one memory 320 including the computer program code 325 for one or more programs, the at least one memory 320 and the computer program code 325 configured to, with the at least one processor 310, cause the apparatus 300 to perform at least some aspects of operation of the respective one of the luminaire control apparatus 126-*k*, the control portion 144 or the control portion 154.

The computer program code 325 may be provided e.g. a computer program product comprising at least one computer-readable non-transitory medium having the computer program code 325 stored thereon, which computer program code 325, when executed by the processor 310 causes the apparatus 300 to perform at least some aspects of operation of the respective one of the luminaire control apparatus 126-*k*, the control portion 144 or the control portion 154. The computer-readable non-transitory medium may comprise a memory device or a record medium that tangibly embodies the computer program. As another example, the computer program may be provided as a signal configured to reliably transfer the computer program.

Reference(s) to a processor herein should not be understood to encompass only programmable processors, but also dedicated circuits such as field-programmable gate arrays (FPGA), application specific circuits (ASIC), signal processors, etc.

The invention claimed is:

1. A method in a lighting system comprising a lighting system control entity and a plurality of luminaires that are wirelessly coupled to the lighting system control entity, wherein the method comprises, in a luminaire of the plurality of luminaires:
   controlling a light output of the respective luminaire in accordance with a preprogrammed lighting control logic that defines switching on light output in response to detecting occupancy at the respective luminaire using one or more of:
   an occupancy sensor for monitoring occupancy at a location of the respective luminaire,
   a light sensor for measuring ambient light level at the location of the respective luminaire,
   a temperature sensor for measuring ambient temperature at the location of the respective luminaire,
   a humidity sensor for measuring air humidity at the location of the respective luminaire,
   a carbon dioxide sensor for measuring a carbon dioxide level at the location of the respective luminaire, or
   a volatile organic compound sensor for measuring respective levels of one or more volatile organic compounds at the location of the respective luminaire,
   transmitting status indications to and receiving status indications from other ones of the plurality of luminaires, wherein each status indication is descriptive of an occurrence of an event pertaining to the luminaire transmitting the respective status indication, and each status indication is stored in an adaptation portion that is responsible for carrying out a learning procedure via an analysis of historical data, deriving respective relationship data including respective one or more relationship strength values, wherein each relationship strength value pertains to a particular one of the other luminaires of said plurality of luminaires and is descriptive of an extent of regularity at which reception of a status indication, that indicates an occurrence of a given event pertaining to the particular other luminaire is followed, with detecting occupancy at the respective luminaire, and transmitting the relationship data to the lighting system control entity; and wherein the method comprises, in the lighting system control entity, controlling at least one aspect of operational dependencies among the plurality of luminaires in accordance with the respective one or more relationship strength values included in the respective relationship data received from the plurality of luminaires to automatically minimize energy consumption while ensuring a desired level of illumination coverage.

2. The method according to claim 1, wherein said given event is at least indirectly indicative of a change of occupancy state at the particular other luminaire from non-occupancy to occupancy and wherein deriving the relationship strength value comprises determining the extent of regularity at which reception of a given status indication from the particular other luminaire is followed with a change in occupancy state from non-occupancy to occupancy at the respective luminaire, wherein the given status indication includes one of the following:

an indication of the particular other luminaire switching on its light output, or an indication of a change in occupancy state from non-occupancy to occupancy at the particular other luminaire.

3. The method according to claim 1, wherein controlling at least one aspect of operational dependency among the plurality of luminaires comprises determining a respective luminaire group for at least one luminaire of the plurality of luminaires based on the relationship data received from the plurality of luminaires, wherein the luminaire group determined for the respective luminaire includes one or more other luminaires of the plurality of luminaires.

4. The method according to claim 3, wherein the method further comprises, in each of said at least one luminaire, introducing one or more further lighting control rules to the preprogrammed lighting control logic in the respective luminaire, wherein said one or more further lighting control rules define switching on the light output of the respective luminaire as a response to reception of a status indication that indicates an occurrence of the given event pertaining to any of the one or more other luminaires included in the luminaire group determined for the respective luminaire.

5. The method according to claim 3, wherein determining the luminaire group for the respective luminaire comprises assigning one or more other luminaires to a luminaire group of the respective luminaire based on respective relationship strength values reported for said one or more other luminaires with the respective luminaire and on respective relationship strength values reported for the respective luminaire with said one or more other luminaires.

6. The method according to claim 1, wherein the method further comprises, in each of the plurality of luminaires, deriving a respective distance measure for one or more other luminaires based on status messages carrying status indications received therefrom, wherein each distance measure is descriptive of a distance between the respective luminaire and a respective one of said one or more other luminaires, and transmitting the distance measures to the lighting system control entity, and wherein controlling at least one aspect of operational dependency among the plurality of luminaires comprises preventing an operational dependency between one or more pairs of luminaires based on the distance measures received from the plurality of luminaires.

7. The method according to claim 6, wherein the distance measure derived in the respective luminaire for the particular other luminaire comprises a received signal strength indication measure that is computed based on respective received signal strength indication values derived for one or more status messages received from the particular other luminaire.

8. The method according to claim 6, wherein preventing the operational dependency comprises preventing the operational dependency between a respective luminaire and a particular another luminaire as a response to the distance measure reported for the particular other luminaire with the respective luminaire indicating a distance that exceeds at least one of a distance threshold or the distance measure reported for the respective luminaire with the particular other luminaire indicating a distance that exceeds the distance threshold.

9. The method according to claim 6, wherein preventing the operational dependency between the respective luminaire and the particular other luminaire comprises one of the following:

preventing creation of the operational dependency between the respective luminaire and the particular other luminaire, or cancelling an operational dependency created between the respective luminaire and the particular other luminaire.

10. The method according to claim 9, wherein cancelling the operational dependency created between the respective luminaire and the particular other luminaire comprises one or both of the following:

deleting, in the respective luminaire, a lighting control rule that depends on reception of a status indication that indicates an occurrence of the given event pertaining to the particular other luminaire, or deleting, in the particular other luminaire, a lighting control rule that depends on reception of a status indication that indicates an occurrence of the given event pertaining to the respective luminaire.

11. The method according to claim 1, wherein controlling at least one aspect of operational dependency among the plurality of luminaires comprises creating an operational dependency between the respective luminaire and the particular other luminaire in dependence of the respective relationship strength values received therefrom; and wherein the method further comprises, in the respective luminaire, introducing an additional lighting control rule to the preprogrammed lighting control logic therein, wherein the additional lighting control rule defines switching on the light output of the respective luminaire as a response to reception of a status indication that indicates an occurrence of the given event pertaining to the particular other luminaire.

12. The method according to claim 11, wherein creating the operational dependency between the respective luminaire and the particular other luminaire comprises creating the operational dependency in response to:

the relationship strength value for the particular other luminaire reported with the respective luminaire exceeding a first threshold, and
the relationship strength value for the respective luminaire reported with the particular other luminaire failing to exceed a second threshold that is smaller than the first threshold.

13. The method according to claim 11, wherein additional lighting control rule defines switching or keeping on the light output of the respective luminaire as a response to receiving a status indication that indicates occupancy at the particular other luminaire and wherein said status indication includes one of the following:
   an indication of the particular other luminaire switching or keeping on its light output, or
   an indication of a change in occupancy state from non-occupancy to occupancy or an indication of continued occupancy at the location of the particular other luminaire.

14. The method according to claim 11, wherein additional lighting control rule defines switching or keeping on the light output of the respective luminaire as a response to receiving a status indication that indicates occupancy at the particular other luminaire and wherein said status indication includes one of the following:
   an indication of the particular other luminaire initiating adjustment of its light output to a stand-by light intensity,
   an indication of a change in occupancy state from occupancy to non-occupancy at the location of the particular other luminaire.

15. A lighting system comprising a lighting system control entity and a plurality of luminaires that are wirelessly coupled to the lighting system control entity, wherein a luminaire of the plurality of luminaries comprises:
   a luminaire control portion arranged to
      control a light output of a respective luminaire in accordance with a preprogrammed lighting control logic that defines switching on light output in response to detecting occupancy at the respective luminaire using one or more of:
      an occupancy sensor for monitoring occupancy at a location of the respective luminaire,
      a light sensor for measuring ambient light level at the location of the respective luminaire,
      a temperature sensor for measuring ambient temperature at the location of the respective luminaire,
      a humidity sensor for measuring air humidity at the location of the respective luminaire,
      a carbon dioxide sensor for measuring a carbon dioxide level at the location of the respective luminaire, or
      a volatile organic compound sensor for measuring respective levels of one or more volatile organic compounds at the location of the respective luminaire, and
      transmit status indications to and receive status indications from other ones of the plurality of luminaires, wherein each status indication is descriptive of an occurrence of an event pertaining to the luminaire transmitting the respective status indication, and each status indication is stored in an adaptation portion that is responsible for carrying out a learning procedure via an analysis of historical data; and
   an adaptation portion arranged to
      derive respective relationship data including respective one or more relationship strength values, wherein each relationship strength value pertains to a particular one of the other luminaires of said plurality of luminaires and is descriptive of an extent of regularity at which reception of a status indication, that indicates an occurrence of a given event pertaining to the particular other luminaire, is followed with detecting occupancy at the respective luminaire, and
      transmit the relationship data to the lighting system control entity; and
   wherein the lighting system control entity comprises
      a control portion arranged to control at least one aspect of operational dependencies among the plurality of luminaires in accordance with the respective one or more relationship strength values included in the respective relationship data received from the plurality of luminaires and to automatically minimize energy consumption while ensuring a desired level of illumination coverage.

16. The lighting system according to claim 15, wherein the control portion of the lighting system control entity is arranged to determine a respective luminaire group for at least one luminaire of the plurality of luminaires based on the relationship data received from the plurality of luminaires, wherein the luminaire group determined for the respective luminaire includes one or more other luminaires of the plurality of luminaires.

17. The lighting system according to claim 16, wherein the control portion of the lighting system control entity is arranged to assign one or more other luminaires to a luminaire group of the respective luminaire based on respective relationship strength values reported for said one or more other luminaires with the respective luminaire and on respective relationship strength values reported for the respective luminaire with said one or more other luminaires.

18. The lighting system according to claim 15,
   wherein the plurality of luminaires is arranged to
      derive a respective distance measure for one or more other luminaires based on status messages carrying status indications received therefrom, wherein the distance measure is descriptive of a distance between the respective luminaire and a respective one of said one or more other luminaires, and
      transmit the distance measures to the lighting system control entity, and
   wherein the control portion of the lighting system control entity is arranged to
      prevent an operational dependency between one or more pairs of luminaires based on the distance measures received from the plurality of luminaires.

19. The lighting system according to claim 15,
   wherein the control portion of the lighting system control entity is arranged to create an operational dependency between the respective luminaire and the particular other luminaire in dependence of the respective relationship strength values received therefrom; and
   wherein the plurality of luminaires is arranged to introduce an additional lighting control rule to the preprogrammed lighting control logic therein, wherein the additional lighting control rule defines switching on the light output of the respective luminaire as a response to reception of a status indication that indicates an occurrence of a given event pertaining to the particular other luminaire.

20. The lighting system according to claim 19, wherein the control portion of the lighting system control entity is arranged to create the operational dependency in response to:

the relationship strength value for the particular other luminaire reported with the respective luminaire exceeding a first threshold, and the relationship strength value for the respective luminaire reported with the particular other luminaire failing to exceed a second threshold that is smaller than the first threshold.

\* \* \* \* \*